Figure 3:
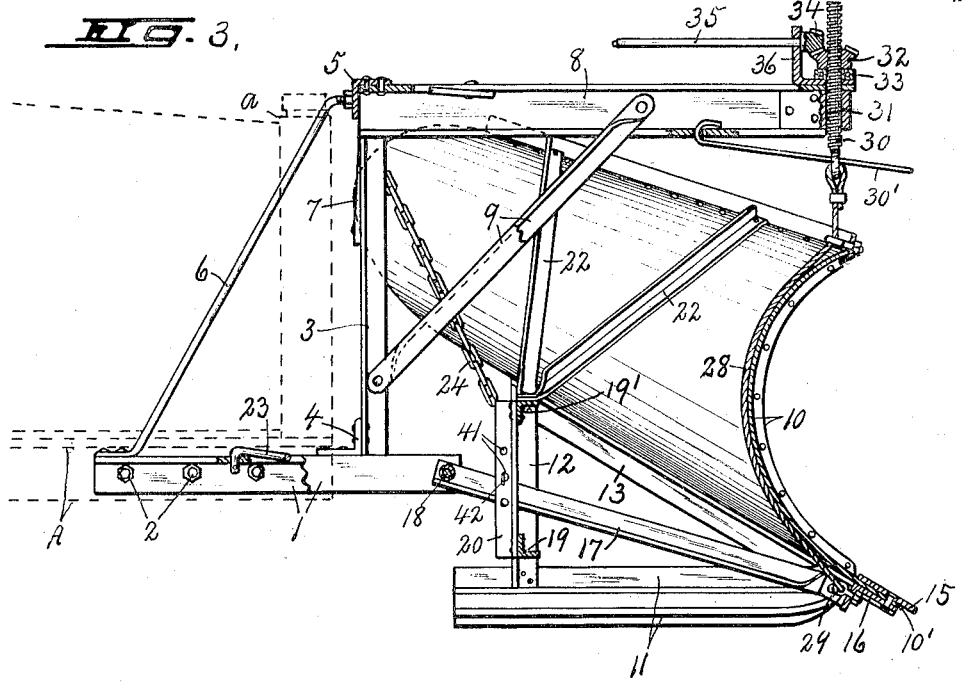

June 22, 1926. 1,589,748
C. H. FRINK
SNOWPLOW ATTACHMENT FOR AUTO TRUCKS
Filed Feb. 12, 1925  2 Sheets-Sheet 1
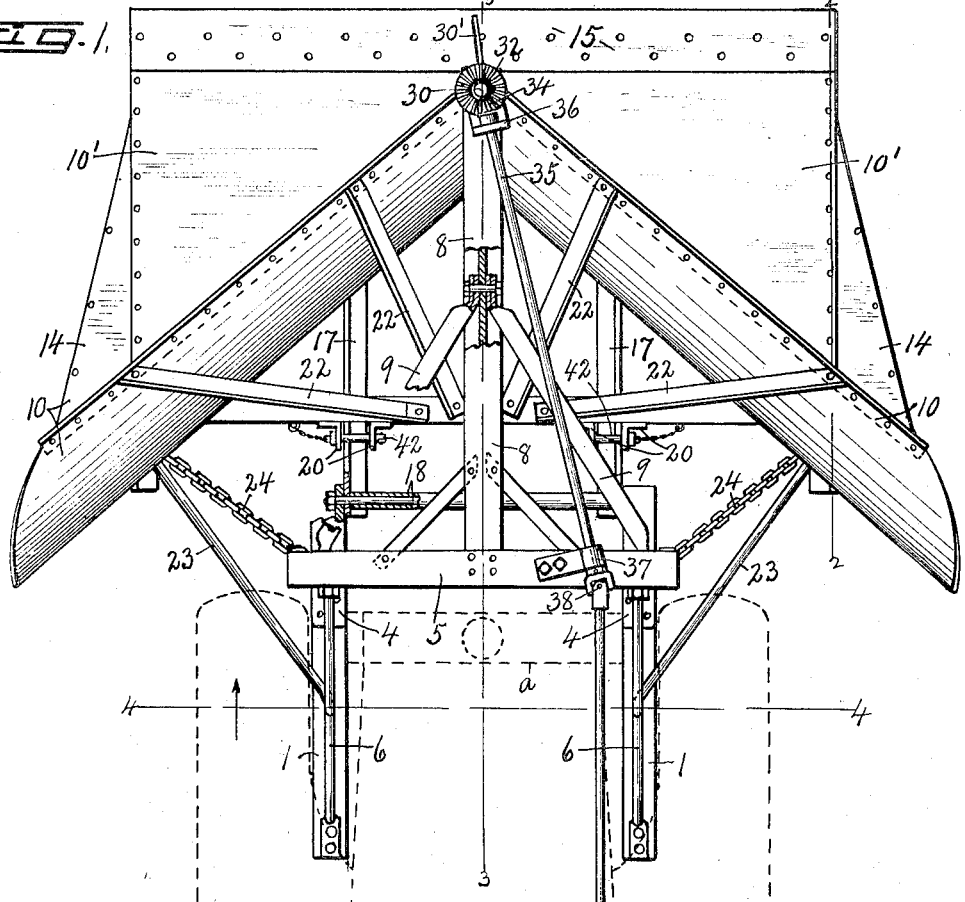
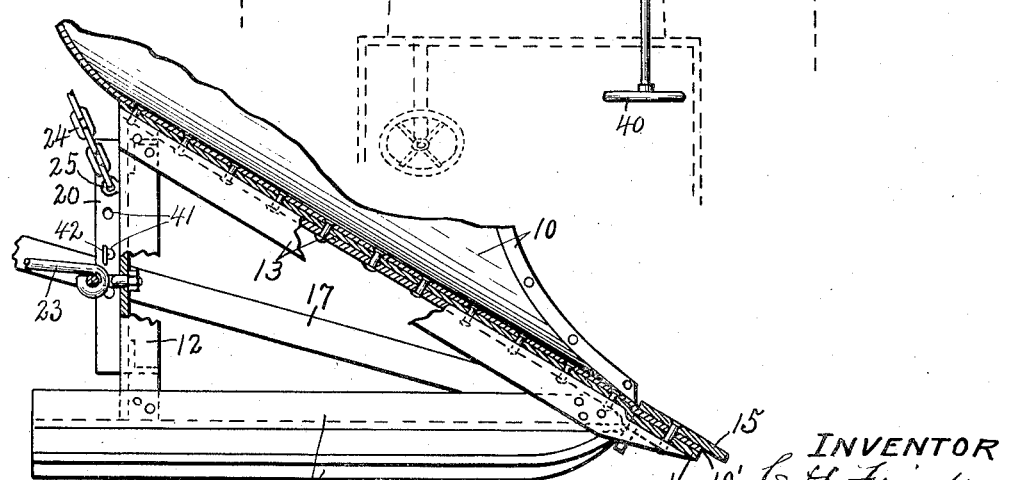
INVENTOR
C. H. Frink
BY
ATTORNEYS
WITNESS June 22, 1926.

C. H. FRINK

SNOWPLOW ATTACHMENT FOR AUTO TRUCKS

Filed Feb. 12, 1925

1,589,748

2 Sheets-Sheet 2

WITNESS

INVENTOR

BY

ATTORNEYS

Patented June 22, 1926.

1,589,748

UNITED STATES PATENT OFFICE.

CARL H. FRINK, OF CLAYTON, NEW YORK.

SNOWPLOW ATTACHMENT FOR AUTO TRUCKS.

Application filed February 12, 1925. Serial No. 8,771.

This invention relates to a snow plow adapted to be attached to the front end of a motor truck to be propelled thereby for clearing the road bed of snow in advance of the steering wheels of the truck and thus affording better driving traction for the traction wheels of the truck.

The main object is to provide a comparatively light, strong and durable plow attachment of this character which may be easily and quickly attached to or detached from the front ends of trucks of standard manufacture so that it may be used for clearing a road of excessive snow when traveling from one place to another with or without a load, when detached and laid aside, permits the truck to be used in the ordinary way.

Another object is to provide the plow with a comparatively wide shoveling blade extending transversely of and equal distances beyond the center line of travel of the truck at substantially right angles thereto and to merge the shoveling blade with suitable mold boards diverging rearwardly from the center line of propulsion for deflecting the snow accumulating upon the shovel to opposite sides of the road bed and beyond the line of travel of the walls and thereby to increase the driving traction of the vehicle.

Another object is to provide means controlled from the driver's seat of the truck for raising and lowering the front end of the plow as may be required under varying conditions of snow and ice on the road bed.

A further object is to provide the plow with suitable supporting runners to facilitate its propulsion along the pavement and also to enable the rear ends of the runners and corresponding portion of the plow thereby tilted upwardly for reducing resistance to the steering of the vehicle with the plow thereon around bends or curves in the road.

Other objects and uses relating to specific parts of the device will be brought out in the following description.

In the drawings:

Figure 1 is a top plan of a snow attachment embodying the various features of my invention showing a portion of a front end of a motor truck to which it is attached.

Figures 2 and 3 are longitudinal, vertical, sectional views taken respectively on lines 2—2, and 3—3, Figure 1, Figure 2 being enlarged.

Figure 4:
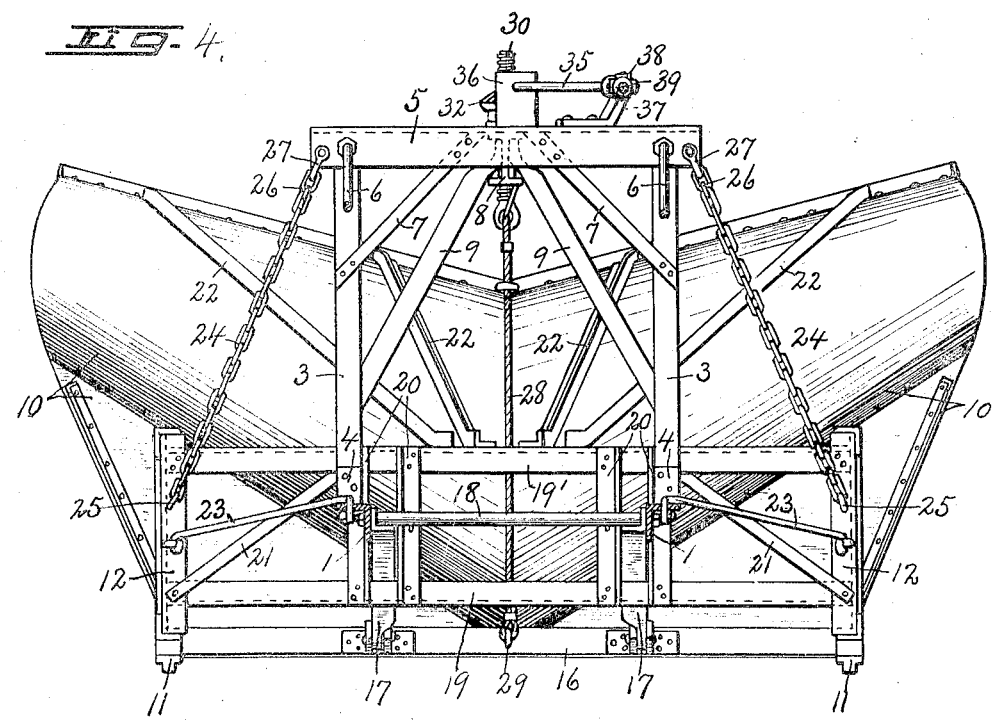

Figure 4 is a transverse vertical sectional view taken on line 4—4, Figure 1.

As illustrated the main supporting frame for the plow and other movable parts comprising a pair of forwardly and rearwardly extending horizontal bars —1— arranged in transversely spaced relation and having their rear ends secured by bolts —2— to the opposite side rails or sills —A— of the chassis frame of any standard make of motor truck having the usual radiator —a—, the front ends of the bars —1— being extended forwardly some distance beyond the radiator.

A pair of upright posts —3— are secured by brackets —4— to the upper faces of the horizontal bars —1— extend upwardly therefrom in parallelism to about the level of the top of the radiator where they are connected by a horizontal transversely-extending bar —5— which is secured to the upper ends of the posts by brace rods —6— extending downwardly and rearwardly therefrom and having their lower ends secured by rivets or other suitable fastening means to the upper faces of the horizontal bars —1—.

Additional diagonal braces —7— are secured to the upright posts —3—, and cross bar —5— brace that portion of the frame against lateral strains.

A forwardly and rearwardly extending plow supporting beam —8— is rigidly secured at its rear end to the central portion of the cross bar —5— midway between the posts —3— and extends forwardly therefrom in a preferably horizontal plane and along the center line of travel of the machine and is held against undue vertical or lateral vibration by a pair of diagonal braces —9— having their upper ends secured to the intermediate portions of the beam —8— and their lower ends secured to the posts —3—.

The parts thus far described constitute a rigid supporting frame for the plow proper and other movable parts of the attachment and when properly secured to the chassis frame of the truck is rigid therewith.

The plow comprises a pair of rearwardly diverging mold boards —10— of sheet metal or equivalent material molded upon a suitable supplemental frame which is operatively connected in a manner presently described to the main frame for relative vertical movement and comprises a pair of forwardly and rearwardly extending shoes or runners —11— arranged in transversely spaced and parallel relation some distance from and at the outer sides of the upright posts —3—.

The runners —11— are adapted to travel along the surface of the road bed in advance of the steering wheel of the truck and some distance to the outer sides of the end thereof and are provided near their rear ends with a pair of upright posts —12— riveted or otherwise rigidly secured thereto, the upper ends of said posts being connected by brace bars —13— to the front ends of the runners, said brace bars —13— being inclined upwardly and rearwardly from the front ends of the runners and are riveted or otherwise rigidly secured at their ends to said runners and to the posts —12— for supporting the outer ends of the mold boards —10— and suitable reinforcing plates —14—.

The forwardly converging ends of the mold boards —10— meet in the center of lengthwise travel of the machine and are rigidly secured to each other by suitable interlocking connections or other fastening means to form the apex of the plow.

These mold boards in addition to their rearward divergence are also inclined upwardly and rearwardly from a horizontal plane, the rear portions thereof being concavo-convex in cross section and arranged with their concave sides facing forwardly for deflecting the snow forwardly and rearwardly to opposite sides of the machine as the latter is being propelled forwardly.

The lower front sides as —10'— of the mold boards are inclined downwardly and forwardly from the lower edges of the concavo-convex portions in a substantially flat inclined plane and is provided along its front edge with a reinforcing plate —15— forming therewith what may be termed a reinforcing shovel plate, the front of which is disposed at substantially right angles to the front edge of the machine and extends equal distances to opposite sides thereof so as to ride closely to the surface of the road bed for picking up the snow and directing it upwardly and rearwardly against the rearwardly diverging portions of the plow and thence to opposite sides of the machine in case the front edge of the shovel is disposed in a substantially horizontal plane.

A reinforcing bar —16— is secured to the lower face of the front edge of the shovel plate —10'— by the same fastening means which secures the plate —15— in place and to this reinforcing bar —16— is pivotally secured one end of a pair of rearwardly extending drive bars —17— having their rear ends pivotally connected at —18— to the front ends of the main frame bars —1— as shown more clearly in Figures 1 and 3.

The end posts —12— of the supplemental plow supporting frame are secured to and directly over the runners —11— and are braced against relative lateral movement by lower and upper horizontal cross bars —19— and —19'— rigidly secured thereto, said cross bars being also braced against relative vertical movement by separate pairs of upright tie bars —20— which are riveted or otherwise rigidly secured to the cross bars in transversely spaced relation, those of each pair being arranged at opposite sides of the adjacent drive bars —17— to guide the supplemental frame in its vertical movement relatively to the main frame as shown more clearly in Figure 4.

The horizontal bars —19— and —19'— and posts —12— and —20— are additionally reinforced or braced by diagonal braces —21— while the upper longitudinal edges of the rear concavo-convex portions of the plow are also braced by diagonal braces —22— connecting them to the upper horizontal bar —19'— of the supplemental frame.

A pair of brace-hooks —23— are pivoted at one end to the opposite end posts —12— of the supplemental frame to extend rearwardly and inwardly therefrom and have their inner ends movable into and out of interlocking engagement with the opposite side bars —1— of the main supporting frame so that when interlocked with said side bars they brace the opposite wings of the plow against lateral movement relatively to the main frame while permitting vertical movement of the plow and the supplemental frame by reason of the pivotal or loose connections of the bars —23— with the supplemental frame and also with the main frame.

The opposite sides of the supplemental frame and plow supported thereby are additionally supported from the opposite ends of the upper cross bar —5— of the main frame by means of a pair of chain cables —24— having their lower ends attached to suitable eyes —25— on the posts —12— and their upper ends connected by grab hooks —26— to suitable clevices —27— on the opposite ends of the cross bar —5—, the flexibility of the chains —24— permitting the supplemental frame with the plow thereon to be moved vertically and limiting the downward movement of those parts while the grab hooks —26— permit either side of the supplemental frame with the plow thereon to be adjusted to impart the desired lateral tilt to the supplemental frame and plow in case the snow at one side of the road is heavier than that at the opposite side.

*Plow adjusting means.*

A cable —28— is extended vertically across the rear face of the apex of the plow at the junction of the mold boards —10— and has its lower end connected to an eye bolt —29— on the central portion of the reinforcing bar —16— of the plow-supporting frame and its upper end connected to an upright eye bolt or screw —30— which extends through an opening —31— in the front end of the beam —8— of the main supporting frame and engaged by a gear nut —32—.

This gear nut —32— rests upon an end thrust ball bearing —33— and is engaged by a pinion —34— on the front end of a rearwardly extending shaft —35—, the latter being journaled in suitable bearings —36— and —37— on the top of the main supporting frame and having its rear connected by a universal joint —38— to an operating member —39—.

This operating member —39— preferably consists of an extension of the shaft —35— and extends to a point in proximity to the driver's seat on the truck where it is provided with a hand wheel —40— by which the shaft sections —39— and —35— may be turned for operating the nut —32— and thereby raising and lowering the plow and its supporting frame about the axis of the pivotal rod —18— for the purpose of varying the depth of cut of the point of the front edge of the plow.

The vertical tie bars —20— of each pair are provided with a series of vertically spaced apertures —41— for receiving cross pins —42— extending across the intervening spaces between the bars of each pair and adapted to rest upon the upper edges of the adjacent portions of the drive bars —17— for additionally supporting the supplemental frame in different positions of vertical adjustment but more particularly to hold the rear end of the plow and its supporting frame at different angles relatively to the bars —17— as may be required to facilitate steering of the machine by the front wheels of the vehicle.

For example, if the runners —11— were in a horizontal position and traveling through relatively deep snow it might interfere with the steering of the machine around bends and turns in the road and in order to avoid this condition the rear ends of the runners and superposed structure carried thereby may be rocked upwardly about the axis of the pivotal connection between the front ends of the drive bars —17— and reinforcing bar —16— to bring one or the other of the lower holes —41— in the upright bars —20— into registration with the upper faces of the adjacent portions of the drive bars —17— whereupon the pins —42— may be withdrawn and reinserted in the last named holes to support the runners and superposed structure in their upwardly and forwardly tilted positions relatively to the bars —17— where they will be held by the reinsertion of the bolts —42— thereby permitting the lower edges of the front portions only of the runners to engage the road bed and permitting the machine to be more easily guided around the bends and turns in the road without interfering with the efficient action of the plow. This same condition may however be effected by the adjustment of the chains —24— through the medium of the grab hooks —26— or the lateral tilting of the plow supporting frame may also be effected by proper adjustment of the pins —42— in different holes —41— in the upright tie bars —20—.

A rocking member —30'— is attached to a portion of the beam —8— of the main frame and is passed through the eye of the bolt —30— to hold the latter against turning, particularly when the nut —32— is operated for raising and lowering the plow.

*Operation.*

When the plow is properly attached to the chassis frame of the truck in the manner described the driver of the vehicle may readily adjust the height of the plow point by the manipulation of the hand wheel —40— from the driver's seat which, by the peculiar arrangement of the cable —28— causes the plow and supporting-frame to be rocked upwardly about the axis of the pivot —18—, the front end of the plow being supported by said cable while the rear end is supported by the chains —24—and also by the bars —17— through the medium of the pins —42— but, as previously stated, the rear end of the plow including the runners —11— may be raised or lowered to different angles relatively to the bars —17— as may be required to facilitate guiding of the machine around bends and turns or for any other purpose, or, the plow including its runners —11— may be tilted laterally as may be required in operating upon drifts at the side of the road or when there is heavier work at one side than at the other side of the plow.

What I claim is:

1. A snow plow attachment for motor trucks comprising a main frame having means for rigidly securing it to the chassis of a truck, a supplemental plow-supporting frame movable vertically relatively to the main frame, drive bars pivotally connected to the main frame and to the supplemental frame, means on the supplemental frame adjustable to different positions vertically for engaging the upper edges of the bars between said pivotal connections for holding the supplemental frame at different angles relatively to said bars, and means for raising and lowering the supplemental frame about the axis of the pivotal connection between the drive bars and main frame.

2. A snow plow attachment for motor trucks comprising a main frame having means for rigidly securing it to the chassis of a truck, drive bars pivotally connected to the main frame and extended forwardly therefrom, a supplemental frame pivotally connected to the front ends of the drive bars for relative vertical rocking movement about the axis of the second named pivotal connection and extending rearwardly therefrom, means cooperating with the drive bars for supporting the supplemental frame at different angles relatively thereto, and means operatively connected to the front end of the supplemental frame for raising and lowering the same about the axis of the pivotal connection between the drive bars and main frame.

3. A snow plow attachment for motor trucks as in claim 2 in which flexible connections are employed for additionally supporting the supplemental frame from the main frame.

4. A snow plow attachment for motor trucks as in claim 2 in which flexible cables are attached to one of the frames and are adjustably connected to the other frame.

5. A snow plow attachment for motor trucks as in claim 2 in which hook shaped members are hinged to opposite sides of one of the frames and detachably interlocked with adjacent sides of the other frame.

6. A snow plow attachment for motor trucks comprising a main frame having means for securing it to the chassis frame of the truck and provided with a forwardly extending beam along the longitudinal center of the machine, drive bars pivoted to the main frame at opposite sides of the beam, a supplemental frame pivotally connected to the front ends of the drive bars, a snow plow mounted on the supplemental frame and provided with wings diverging rearwardly from the front end of the beam at opposite sides thereof and at equal angles thereto and means for raising and lowering the supplemental frame relatively to the main frame.

7. A snow plow attachment for motor trucks comprising a main frame having means for securing it to the chassis frame of the truck and provided with a forwardly extending beam along the longitudinal center of the machine, drive bars pivoted to the main frame at opposite sides of the beam, a supplemental frame pivotally connected to the front ends of the drive bars, a snow plow mounted on the supplemental frame and provided with wings diverging rearwardly from the front end of the beam at opposite sides thereof and at equal angles thereto, means for raising and lowering the supplemental frame relatively to the main frame, and braces between the rear ends of the wings and the main frame.

8. A snow plow attachment for motor trucks comprising a main frame having means for securing it to the chassis frame of the truck and provided with a forwardly extending beam along the longitudinal center of the machine, drive bars pivoted to the main frame at opposite sides of the beam, a supplemental frame pivotally connected to the front ends of the drive bars, a snow plow mounted on the supplemental frame and provided with wings diverging rearwardly from the front end of the beam at opposite sides thereof and at equal angles thereto, and means for raising and lowering the supplemental frame relatively to the main frame.

In witness whereof I have hereunto set my hand this 3d day of February, 1925.

CARL H. FRINK.